(12) United States Patent
Lessner et al.

(10) Patent No.: US 6,459,565 B1
(45) Date of Patent: Oct. 1, 2002

(54) SURFACE MOUNT ALUMINUM CAPACITOR HAVING ANODE FOIL ANODIZED IN AN AQUEOUS PHOSPHATE SOLUTION

(75) Inventors: Philip Michael Lessner, Simpsonville, SC (US); Brian John Melody, Greer, SC (US); John Tony Kinard, Greer, SC (US); Erik Karlsen Reed, Mauldin, SC (US); Albert Kennedy Harrington, Fountain Inn, SC (US); Daniel F. Persico, Simpsonville, SC (US); David Alexander Wheeler, Williamston, SC (US)

(73) Assignee: Kemet Electronics Corporation, Greenville, SC (US)

( * ) Notice: Subject to any disclaimer, the term of this patent is extended or adjusted under 35 U.S.C. 154(b) by 0 days.

(21) Appl. No.: 09/891,208

(22) Filed: Jun. 26, 2001

Related U.S. Application Data

(60) Provisional application No. 60/296,725, filed on Jun. 11, 2001.

(51) Int. Cl.⁷ .................................................. H01G 9/04
(52) U.S. Cl. ........................ 361/508; 361/523; 361/528; 361/529; 361/511; 29/25.03
(58) Field of Search ................................ 361/508, 509, 361/512, 523, 528, 529, 433, 503, 504, 511; 29/25.09

(56) References Cited

U.S. PATENT DOCUMENTS

| | | | | |
|---|---|---|---|---|
| 4,189,761 A | * | 2/1980 | Finkelstein et al. | 361/433 |
| 5,055,974 A | * | 10/1991 | Washio et al. | 361/527 |
| 5,870,275 A | * | 2/1999 | Shiono et al. | 361/504 |
| 6,166,899 A | * | 12/2000 | Tamamitsu | 361/504 |
| 6,185,088 B1 | * | 2/2001 | Youker et al. | 361/328 |
| 6,206,937 B1 | * | 3/2001 | Kudoh et al. | 29/25.03 |
| 6,208,502 B1 | * | 3/2001 | Hudis et al. | 361/503 |

* cited by examiner

*Primary Examiner*—Dean A. Reichard
*Assistant Examiner*—Nguyen Ha
(74) *Attorney, Agent, or Firm*—Banner & Witcoff, Ltd.

(57) ABSTRACT

Aluminum surface mount capacitors containing one or more anode foil coupons are initially anodized in an aqueous phosphate solution in order to produce an anodic oxide film having extreme resistance to hydration and attack by corrosive anions for the purpose of producing surface mount capacitors at high yield and of high stability.

10 Claims, 6 Drawing Sheets

SURFACE MOUNT ALUMINUM CAPACITOR HAVING ANODE FOIL ANODIZED IN AN AQUEOUS PHOSPHATE SOLUTION

This application is a continuation-in-part of copending provisional application 60/296,725 filed on Jun. 11, 2001, which is hereby incorporated by reference in its entirety.

FIELD OF THE INVENTION

The invention relates to aluminum surface mount capacitors having anode foil anodized in an aqueous phosphate solution.

BACKGROUND OF THE INVENTION

Surface mount electrolytic capacitors may be categorized as one of two basic types, those having powder metallurgy bodies, generally fabricated from tantalum or niobium powder, and those having foil coupon anode bodies. The foil coupons used in the latter type of capacitor are usually cut from high purity etched and anodized aluminum foil.

Typically, as shown in FIG. 1, coupons 1 cut from anodized foil are suspended from a bar 2 which provide mechanical registration and electrical connection. The coupons 1 are anodized to form anodic oxide on the cut edges of the coupons prior to coating with a conductive polymer/graphite/silver or other conductive paint and assembly into a finished capacitor complete with a molded or conformal insulating plastic case. The devices are then "aged" with voltage applied (to produce devices having stable electrical properties), tested and placed into reels for shipment to customers. Conductive polymer cathodes are preferred due to the relatively high resistivity and low thermal stability of traditional liquid electrolytes used to fabricate most leaded aluminum electrolytic capacitors. Conductive polymer cathode material is desirable over pyrolytic manganese dioxide (used in solid, surface mount tantalum capacitors) due to the degradation of the anodic oxide film which occurs when anodized aluminum is exposed to the temperatures and highly acidic conditions associated with pyrolytic manganese dioxide production from manganese nitrate solutions.

It was discovered that the production of stable surface mount, stacked-foil aluminum electrolytic capacitors having conductive polymer cathode material at high yields is rendered difficult by the instability of the aluminum oxide dielectric towards hydration. This instability can lead to problems in welding the anodes of the capacitors during assembly, elevated initial leakage, and leakage instability on storage in a humid environment.

Aqueous solutions of dicarboxylic salts, such as ammonium adipate, are used to produce the dielectric oxide on the vast majority of aluminum capacitor foil in use today. This oxide has excellent dielectric and capacitance properties, but it is highly susceptible to hydration. The anodized foil is usually coated with a thin phosphate layer by dipping in dilute phosphoric acid and heating the foil to dry the surface, etc. to help resist this hydration upon exposure to humidity, but the thin layer nature of this phosphate coating provides only limited resistance to hydration. The surface phosphate coating is sufficient to protect the foil during handling. For wet aluminum capacitors, where the foil is sealed in a can in contact with a substantially nonaqueous electrolyte, the surface hydration-resistant layer is also sufficient to keep the foil from hydrating during the life of the capacitor. Phosphate salts are also added to the liquid electrolyte to retard hydration. However, for solid electrolytic capacitors with aluminum oxide dielectrics and conductive polymer cathodes this surface hydration-resistant layer provides insufficient protection.

The solid aluminum electrolytic capacitors with conductive polymer cathodes are susceptible to hydration at several points in the manufacturing process. One such point is during the polymerization process. The catalyst/oxidizing agents/doping acids present during in situ production of the conductive polymer cathode layer have been found to be very destructive to the thin hydration-resistant layer on the anodic oxide surface. For example, U.S. Pat. No. 4,910,645 to Jonas describes the application of various polythiophenes to anodized aluminum substrates. In a preferred embodiment of Jonas, 3,4-ethylenedioxythiophene is applied using an iron III salt or an alkali metal or ammonium persulfate to oxidize the 3,4-ethylenedioxythiophene monomer. With either type of oxidizing agent, iron III salt or persulfate, the pH is reduced over the course of the polymerization reaction due to the liberation of acid; in the case of the persulfate salt, sulfuric acid is liberated. It is well known that sulfuric acid tends to have a corrosive effect upon aluminum depending upon the solution temperature and concentration, as well as upon the time of exposure.

Tests have demonstrated that the amount of sulfuric acid generated during the polymerization process is such that over ¾ of the phosphate coating present on commercially available capacitor anode foil may be dissolved from the surface of the surface of the foil during the conductive polymer application. After polymerization, the capacitors are washed in elevated temperature water (>50° C.) to remove polymerization by products. Because the surface hydration-resistant layer has been damaged, the capacitors are very susceptible to hydration at this point in the process. Hydration during the washing step can lead to inability to weld the capacitor to the lead frame and elevated leakage current, and, therefore, lower yield and quality.

After the process of assembly and molding during which the polymer/carbon/silver paint-coated anode coupons are cut from the support bars, stacked on a lead frame with the polymer-coated ends attached to the lead frame cathode via conductive adhesive and the uncoated ends welded to the lead frame anode portion via resistance or laser welding, the capacitor assemblies are then encapsulated by transfer molding, etc., to produce the finished capacitor. Unfortunately the assembly and molding or other insulating coating application process gives rise to numerous cracks in the dielectric. FIG. 2 shows an aluminum substrate 3 having an aluminum oxide coating 4, a phosphate outer layer of aluminum oxide 5 and a crack 6 in the aluminum oxide. The crack 6 acts as an electrical leakage site when the devices are electrified.

In order to reduce the leakage current, the molded capacitors are electrified prior to testing. Co-pending application, U.S. Ser. No. 09/812,896, hereby incorporated by reference in its entirety,. discloses that aging of aluminum capacitors containing conductive polymer cathodes are enhanced when the capacitors are moist and at an elevated temperature. The moisture contained within the molded devices appears to undergo electrolysis, providing oxygen to the cracks in the anodic oxide, producing a "plugged crack" 7 with fresh anodic oxide (FIG. 3). This results in reduced leakage current and oxidative degradation of the conductive polymer adjacent to cracks in the oxide. However, if the phosphate coating on the anodic oxide has been partially or wholly dissolved by the action of acids evolved during the polymerization process, the anodic oxide tends to undergo hydration during moisture exposure prior to electrifying or "aging". This results in increased leakage current and reduced yields.

Similarly, if the anodic oxide is damaged more than slightly during the assembly and molding processes, the anodic oxide will undergo hydration from moisture seeping into cracks in the oxide and causing a lateral spread of oxide hydration 8 underneath the protective layer of phosphate coating the external anodic oxide surface as shown FIG. 4. Unless it is very carefully adjusted, modem, high-speed assembly equipment provides ample opportunity for damage to the anodic oxide. Once the anodic oxide has become hydrated, it is very difficult to reduce the device leakage current. If the hydration is sufficiently severe, the device capacitance will also be reduced due to the formation of bulky hydrated oxide in the pores of the foil. This can result in capacitor failure during storage or use.

The use of ammonium citrate in combination with ammonium phosphate edge formation electrolyte is disclosed in a co-pending application U.S. Ser. No. 09/874,388, which is hereby incorporated by reference in its entirety, as a way improving the hydration resistance of slit foil for use in solid aluminum capacitors with conductive polymer cathodes. This combination of electrolytes can restore hydration resistance in cracks in the oxide produced prior to polymerization and also form a hydration resistant oxide layer on the edges. However, damage to the outer hydration-resistant layer during polymerization and cracks in the oxide produced during the assembly and molding process occur after the edge formation process is performed. Thus, an aluminum oxide that is hydration resistant throughout the entire oxide volume is needed.

Phosphate is a well known hydration inhibitor for aluminum oxide. It can be used as an additive in solution to inhibit hydration (Vermilyea et al.) or incorporated into the oxide. As discussed above, incorporation of phosphate on the surface of aluminum oxide is well known for inhibiting hydration resistance of foil intended for use in wet aluminum electrolytic capacitors.

As an additive, phosphates are used in the so-called "operating electrolytes" of liquid electrolyte solution-containing ("wet") aluminum capacitors (referenced in Alexander M. Georgiev's 1945 book, entitled: "The Electrolytic Capacitor," page 41, (Ferris Printing Company, New York )).

To produce an anodic oxide containing phosphate on aluminum, good aqueous phosphate solution anodizing results are generally obtained with solutions having a pH of approximately 5 to 6 and at a temperature of approximately 90° C. Even under these conditions, phosphate anodizing tends to result in dissolution of a significant amount of the substrate aluminum. This dissolution tends to form deposits of aluminum phosphate on the walls and bottoms of the anodizing tanks used for the process, as well as on the surface of the foil. Additionally, anodizing in phosphate solutions usually results in anodized foil having about 10–15% lower capacitance for a given anodizing voltage than for the same foil (i.e., foil having the same etch structure) anodized in solutions containing carboxylic acid salts such as ammonium adipate. For these reasons, phosphate anodizing solutions have not been used to anodize aluminum for d.c. aluminum capacitors for decades, although some phosphate anodizing is used to produce anodized foil for a.c. motor-start capacitors, which are filled with a liquid or semi-solid glycol-borate electrolyte, where hydration resistance under reverse polarization is critical to proper device performance.

The sensitivity of standard carboxylic acid salt solution anodized capacitor anode foil to hydration, the corrosion by acids produced during conductive polymer application, and the tendency of mechanically damaged foil to undergo lateral hydration at cracks which undercuts the protective phosphate surface coating, all contribute to yield losses during the production of surface mount aluminum capacitors. Such problems mandate the implementation of careful control of polymer chemical solutions, assembly equipment set-up and speed, and humidity exposure before electrical aging of the finished devices, all of which tend to increase the cost of manufacture.

BRIEF SUMMARY OF THE INVENTION

The invention is directed to aluminum surface mount capacitors comprising one or more anode foil coupons wherein the aluminum foil coupons are initially anodized in an aqueous phosphate solution. The anodic oxide film produced in the aqueous phosphate anodizing solution provides extreme resistance to hydration and attack by corrosive anions.

The aluminum surface mount capacitors can be produced at high yield and having high stability. The stability of the oxide on phosphate-anodized coupons also minimizes the cost of production of the finished capacitors by maximizing yield and minimizing bum-in requirements for the finished devices.

The present invention is directed to an aluminum surface mount capacitor comprising at least one aluminum foil anode having a conductive polymer coating wherein the anode comprises a phosphate-anodized aluminum foil coupon. More particularly, the present invention is directed to anodizing an aluminum anode foil in an aqueous electrolytic solution comprising a phosphate.

The present invention is also directed to a method of preparing an anodized aluminum foil anode comprising immersing an aluminum foil coupon in an aqueous electrolytic solution comprising at least one phosphate and then applying an anodizing voltage to the aqueous electrolytic solution.

DETAILED DESCRIPTION OF THE INVENTION

Figure 1:
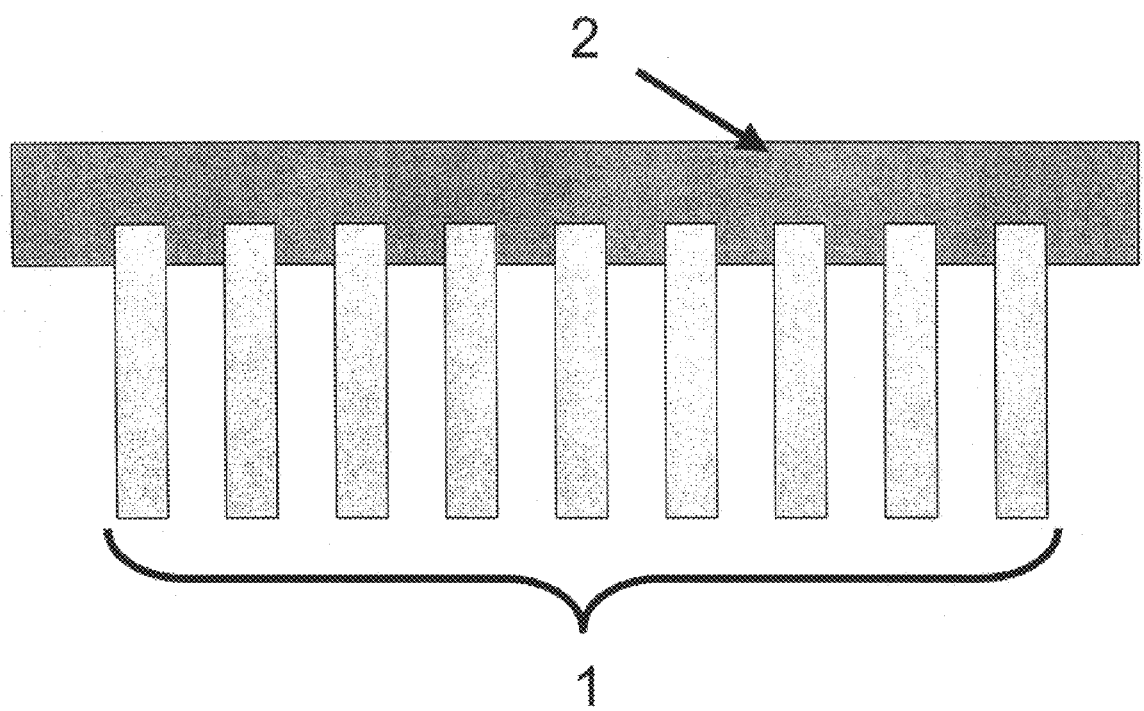
FIG. 1 shows aluminum coupons attached to a process bar.
Figure 2:
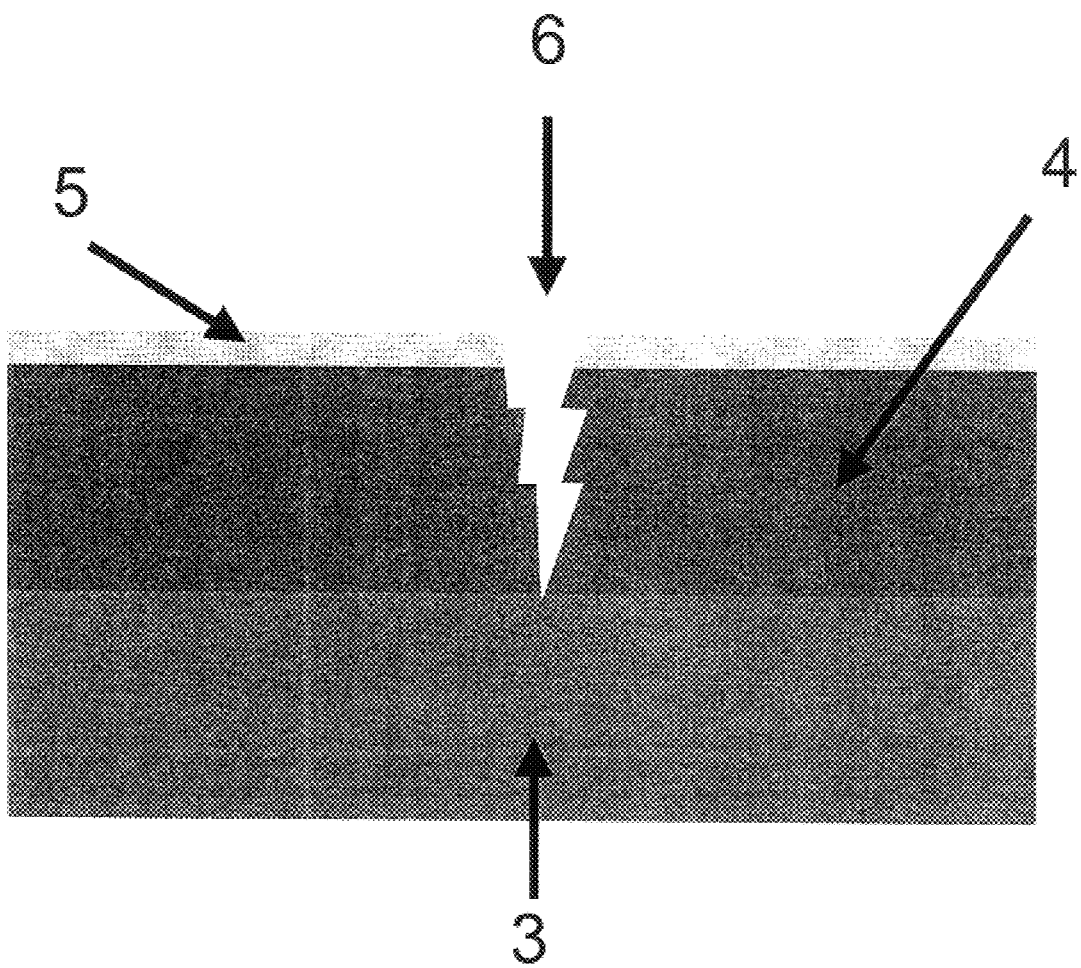
FIG. 2 shows an aluminum substrate having a crack in the dielectric coating.
Figure 3:
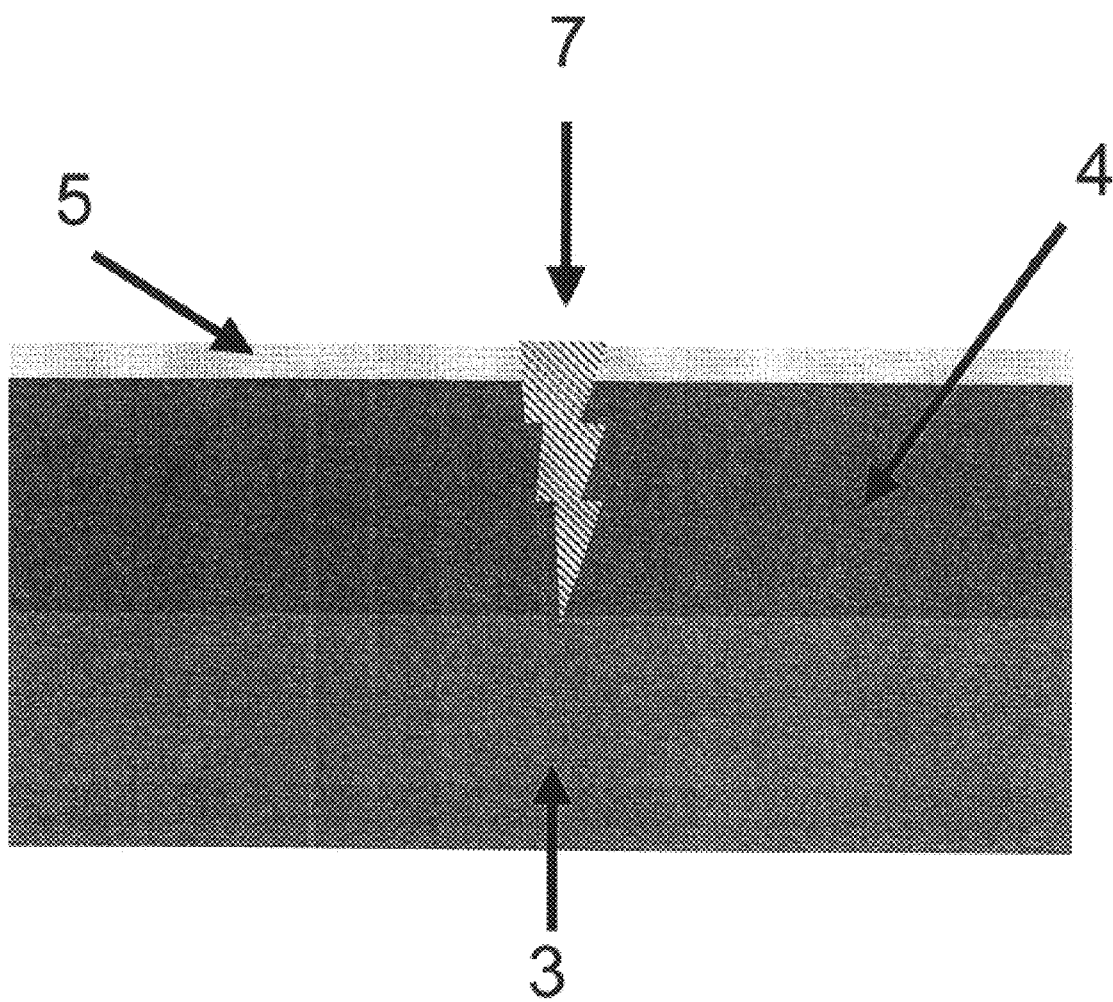
FIG. 3 shows the aluminum substrate of FIG. 2 with the crack in the dielectric floating "plugged."

It was discovered that phosphate-containing aqueous electrolytic solutions produce anodic oxide dielectric coatings, which are very resistant to reaction with water. Aluminum anode foil coupons anodized in phosphate-containing aqueous electrolytic solutions and coated with conductive polymer cathode materials produce thermally and hydrolytically stable surface mount aluminum capacitors.

It is believed that, since the phosphate is incorporated throughout the oxide, not just as a surface coating, the oxide is resistant to hydration after corrosion by materials produced as by-products of in-situ polymer production, and lateral hydration due to cracks produced during assembly and molding.

It was also discovered that anodic aluminum oxide produced in aqueous phosphate solutions, both aqueous and partially non-aqueous (e.g., glycerine solutions,) is extremely resistant to reaction with water, even if the oxide is very thin such as oxide produced at 4–20+ volts. This is in contrast to anodic aluminum oxide, which is formed in aqueous dicarboxylic acid salts, such as ammonium adipate, and then treated with a surface layer of phosphate. The hydration resistance of the latter oxides are sufficient for wet aluminum electrolytic capacitors, but are not sufficient for solid electrolytic capacitors containing conductive polymer cathodes due to the corrosion of the outer oxide layer and cracks produced during assembly and molding.

In accordance with a preferred embodiment of the invention, an aluminum foil coupon is anodized in an aqueous electrolytic solution containing at least one phosphate. The phosphate may be one or more of an ammonium, alkali metal, or amine phosphate. Preferably the phosphate is ammonium phosphate.

The concentration of the phosphate in solution is about 0.01 wt % to about 10 wt %, preferably about 0.05 wt % to about 2 wt %, more preferably about 0.1 wt %. The pH of the electrolyte solution may be about 4 to about 8, preferably about 4.5 to about 7, more preferably about 5.

The electrolytic solution may contain other ingredients that do not affect the basic characteristics of the phosphate. Other ingredients include, but are not limited to glycerine.

The electrolytic solution is subjected to an anodizing voltage of about 2 volts to about 200 volts, preferably about 4 volts to about 100 volts. The temperature of the solution is about 20° C. to about 140° C., preferably about 50° C. to about 95° C., more preferably about 80° C. to about 90° C.

The anodized foil is then cut into coupons of appropriate size, and then the coupons are welded to process bars. The edges of the coupons are preferably anodized in an electrolytic solution to coat the cut edges with anodic oxide. Preferably, the edge anodizing uses the same phosphate electrolytic solution used for anodizing the aluminum anode foil.

The coupons are then coated with a conductive polymer, graphite, and silver paint prior to assembly into finished capacitors. Conductive polymers include, polypyrrole, polyaniline, polythiophene, and their derivatives. The conductive polymer is preferably acid-doped polyethylene dioxythiophene. The assembled, molded capacitors are then subjected to aging in a moist atmosphere.

EXAMPLE 1

The hydration resistance imparted by anodizing in phosphate solution is demonstrated by measuring the 25° C. leakage current through anodized coupons at the 80–90° C. anodizing voltage, subjecting the coupons to hydrating conditions, such as immersion in 70° C. water for 90 minutes, followed by a second determination of leakage current. An aqueous 10% ammonium adipate solution may be used for the leakage measurements.

Coupons anodized in phosphate solutions are found to give little or no increase in leakage current, while coupons anodized in ammonium adipate solution show a very substantial increase in leakage current of 2 to 3 orders of magnitude. Coupons cut from etched and adipate-anodized anode foil having a phosphate coating for hydration resistance, and "edge-formed" or edge-anodized in a 0.1% ammonium phosphate solution, exhibit hydration resistance nearly equivalent to that of coupons of phosphate-anodized foils. However, phosphate-coated, adipate-anodized foil coupons exhibit gross hydration if scratched, to simulate handling damage, prior to exposure to 70° C. water for 90 minutes.

Figure 4:
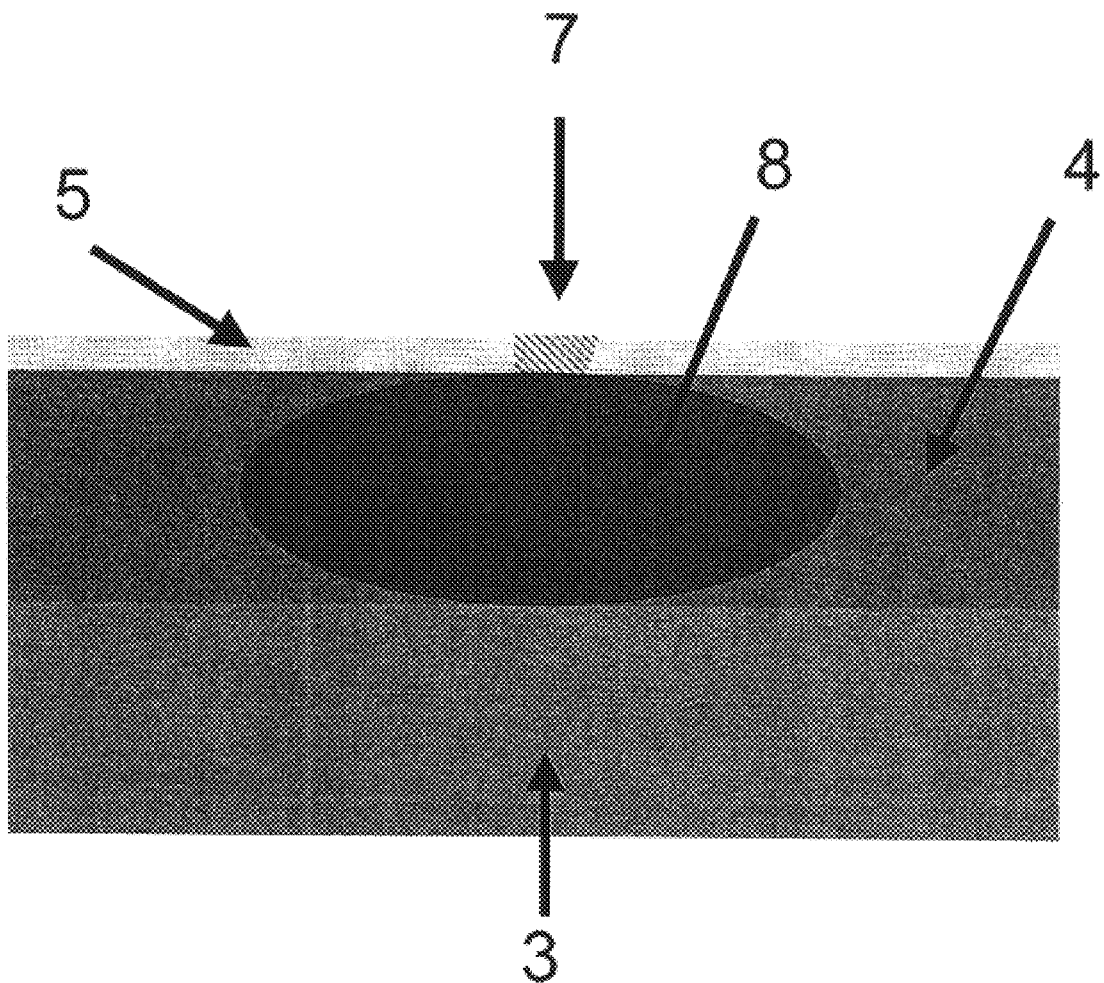
FIG. 4 shows the aluminum substrate of FIG. 3 with a growing area of hydrated oxide at the "plugged" crack.
Figure 5:
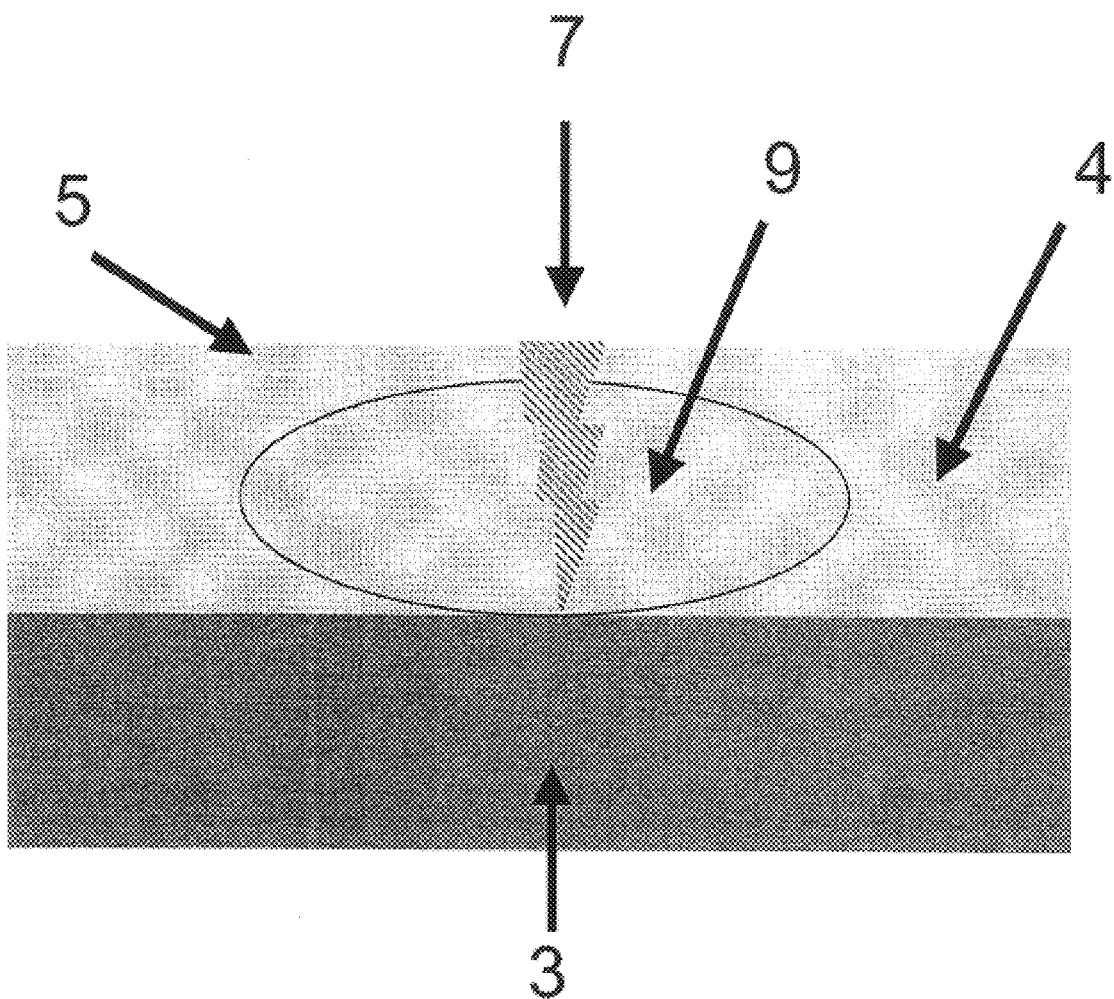
FIG. 5 shows an aluminum substrate with a crack in the dielectric coating "plugged" in accordance with the instant invention with no hydration of the oxide.

It is believed that moisture enters the scratch and migrates into the adipate-derived anodic oxide undercutting the phosphate coating as depicted in FIG. 4. The resulting hydrated oxide is visible as a black discoloration of the light gray oxide. As shown in FIG. 5, etched foil coupons anodized in phosphate solutions at 80–90° C. to form a phosphate-anodized aluminum oxide 9, and then scratched prior to 70° C./90 minute hot water exposure, do not exhibit visible hydration 11 in the "plugged" crack nor a significant increase in leakage current.

The extreme resistance to hydration of even the scratched phosphate-derived anodic aluminum oxide films appears to be due to the presence of phosphate throughout the total anodic oxide layer thickness as indicated by recent spectrographic analysis of thin anodic films formed in phosphate. Although most of the phosphate is present in the outer portion of the film, some phosphate is present down to the metal/oxide interface. Thus, the standard aluminum anode foil of commerce, which is anodized in aqueous carboxylic acid salt solution and coated with phosphate in a post-anodizing step, might reasonably be expected to undergo degradation due to hydration when incorporated into surface mount capacitors. Surface mount capacitors prepared from etched capacitor foil, anodized in a phosphate solution, should be very resistant to hydration degradation.

EXAMPLE 2

Two groups of 47 $\mu$F/6 volt capacitors were prepared to demonstrate the superior moisture resistance of surface mount aluminum electrolytic capacitors containing aluminum anode coupons, anodized in a phosphate, compared with surface mount aluminum capacitors containing aluminum anode foil coupons, anodized in conventional carboxylic acid salt solution.

Group A—Control Parts

Control parts were fabricated using commercially available etched aluminum anode foil, which had been anodized in an ammonium adipate electrolyte solution and coated with phosphate as is the industry practice. The withstanding voltage of this foil was found to be approximately 17 volts by constant current testing in ammonium adipate solution at 50° C.

Group B—Phosphate-Anodized Parts

Phosphate-anodized parts were fabricated using commercially available etched aluminum anode foil. This foil was then anodized in-house, in a stainless steel beaker containing an electrolyte solution of 0.1 wt % ammonium phosphate at a pH of approximately 5. The anodizing voltage was approximately 13 volts at 90° C. The anodized foil was found to have a withstanding voltage of approximately 17 volts by constant current adipate solution testing, as done with Group A.

After cutting the anodized foil into coupons of appropriate size, the coupons were welded to process bars and the edges of both groups of coupons were anodized in an identical manner to coat the cut edges with anodic oxide. The coupons were then coated with poly(3,4-ethylene dioxythiophene)

conductive polymer, graphite, and silver paint prior to assembly into finished capacitors.

The assembled, molded capacitors were then subjected to aging in a moist atmosphere. The leakage current of the parts was measured at 6 volts following each 21 hour exposure to an accelerated moisture test at 121° C., 85% relative humidity, 2 atmospheres with no bias applied during the exposure. The results for several capacitors from group A and group B are given in FIG. 6.

Figure 6:
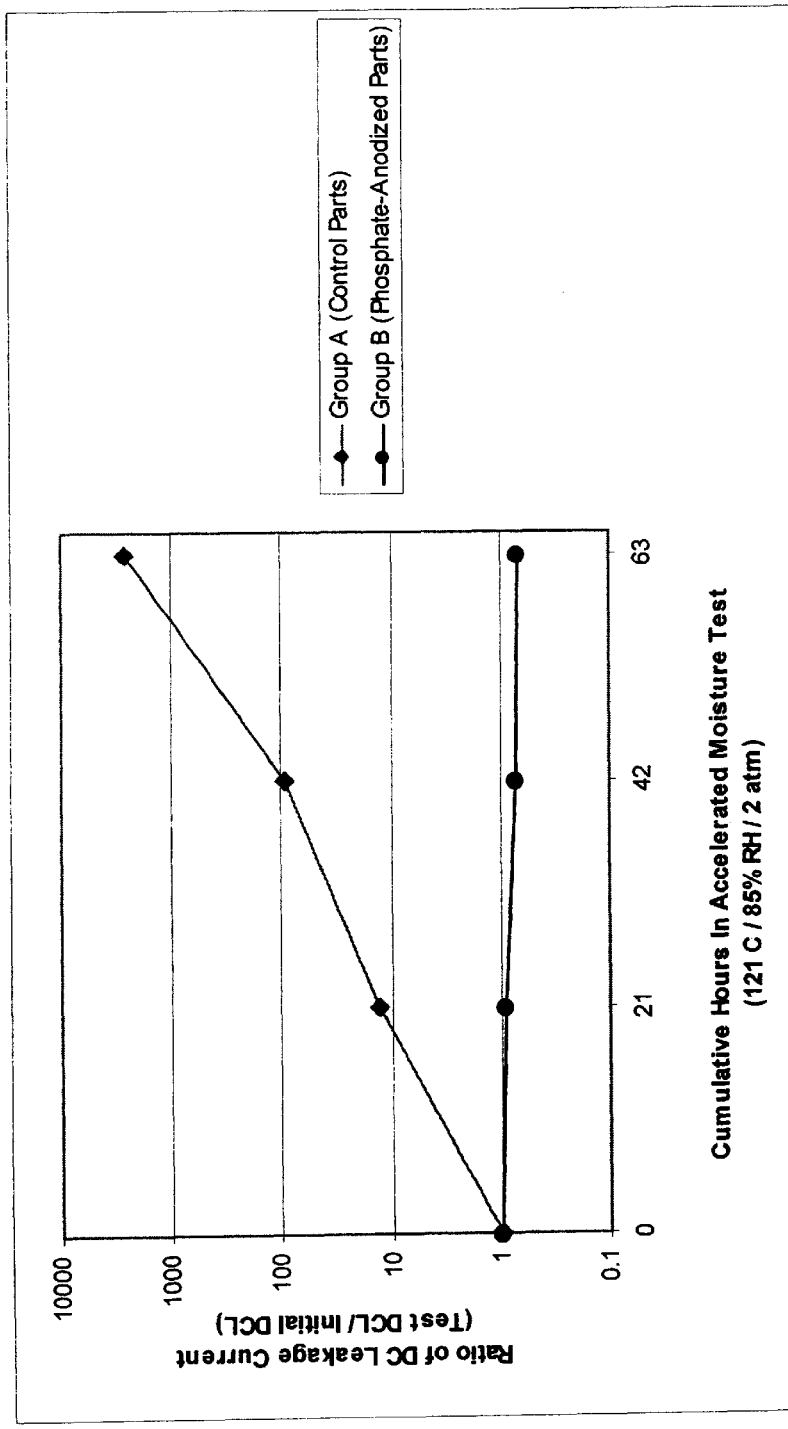
FIG. 6 is a graph of the ratio of DC leakage current based on cumulative hours in an accelerated moisture test for a control group and a phosphate-anodized group.

The data in FIG. 6 reveals that the capacitors fabricated from conventional carboxylic acid salt solution anodized anode foil are sufficiently damaged during polymer coating and assembly to undergo progressive hydration of the anodic oxide during post-molding humidity exposure and that this results in very elevated leakage current.

By contrast, the capacitors fabricated from anode foil anodized in a phosphate electrolyte solution showed no tendency to undergo hydration damage upon exposure to the same conditions as the capacitors fabricated from traditional carboxylate-anodized commercial anode foil.

While the invention has been described with respect to specific examples including presently preferred modes of carrying out the invention, those skilled in the art will appreciate that there are numerous variations and permutations of the above described systems and techniques that fall within the spirit and scope of the invention.

We claim:

1. A surface mount capacitor comprising at least one aluminum foil anode having a conductive polymer coating wherein the anode comprises a phosphateanodized aluminum foil coupon, wherein the surface mount aluminum capacitor is thermally and hydrolytically stable.

2. The surface mount capacitor of claim 1 wherein the phosphate-anodized aluminum foil coupon is prepared by anodizing an aluminum anode foil in an aqueous electrolytic solution comprising at least one phosphate.

3. The surface mount capacitor of claim 2 wherein the phosphate is at least one selected from the group consisting of an ammonium phosphate, an alkali metal phosphate, and an amine phosphate.

4. The surface mount capacitor of claim 3 wherein the phosphate is ammonium phosphate.

5. The surface mount capacitor of claim 2 wherein the concentration of the phosphate in the aqueous electrolytic solution is about 0.01 wt % to about 10 wt %.

6. The surface mount capacitor of claim 5 wherein the concentration of the phosphate in the aqueous electrolytic solution is about 0.05 wt % to about 2 wt %.

7. The surface mount capacitor of claim 2 wherein the aqueous electrolytic solution has a pH of about 4 to about 8.

8. The surface mount capacitor of claim 7 wherein the pH is about 4.5 to about 7.

9. The surface mount capacitor of claim 2 wherein the aqueous electrolytic solution further comprises glycerine.

10. The surface mount capacitor of claim 1 wherein the conductive polymer coating comprises acid-doped polyethylene dioxythiophene.

* * * * *